United States Patent
Konsha

(10) Patent No.: US 6,797,432 B2
(45) Date of Patent: Sep. 28, 2004

(54) METHOD FOR PRODUCING SINTERED CADMIUM NEGATIVE ELECTRODE

(75) Inventor: Akihiko Konsha, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 302 days.

(21) Appl. No.: 10/102,681

(22) Filed: Mar. 22, 2002

(65) Prior Publication Data

US 2002/0182498 A1 Dec. 5, 2002

(30) Foreign Application Priority Data

Mar. 22, 2001 (JP) ........................................ 2001-082814

(51) Int. Cl.⁷ ................................................ H01M 4/36
(52) U.S. Cl. ....................... 429/222; 429/245; 429/217; 429/235; 429/236; 429/241
(58) Field of Search ................................ 429/222, 217, 429/235, 245, 236, 241

(56) References Cited

U.S. PATENT DOCUMENTS

| | | | |
|---|---|---|---|
| 6,534,215 B1 | * | 3/2003 | Shinyashiki et al. ........ 429/222 |
| 2002/0122976 A1 | * | 9/2002 | Tomihara et al. ........... 429/222 |

FOREIGN PATENT DOCUMENTS

| | | |
|---|---|---|
| JP | sho. 61-85772 | 5/1986 |
| JP | sho. 62-115662 | 5/1987 |
| JP | 2567672 | 10/1996 |
| JP | Hei. 11-273669 | 3/1998 |

* cited by examiner

*Primary Examiner*—Laura Weiner
(74) *Attorney, Agent, or Firm*—Nixon & Vanderhye P.C.

(57) ABSTRACT

A cadmium negative electrode is prepared having excellent cycle characteristics without impairing the production efficiency even in case the impurities incorporated during filling the active material should be removed by heat treatment. The method includes filling the nickel sintered substrate with an active material based on cadmium hydroxide to obtain an active material filled electrode plate; heating the active material filled electrode plate to change at least a part of the thus filled active material based on cadmium hydroxide into cadmium oxide; adding polyvinyl alcohol into the active material; and hydrating the active material filled electrode plate added with polyvinyl alcohol i.e., immersing the electrode plate in an alkaline solution to convert cadmium oxide into cadmium hydroxide.

6 Claims, 1 Drawing Sheet

METHOD FOR PRODUCING SINTERED CADMIUM NEGATIVE ELECTRODE

BACKGROUND OF THE INVENTION

The present invention relates to a method for producing sintered cadmium negative electrode for use in nickel-cadmium storage batteries.

Cadmium negative electrodes for use in nickel-cadmium storage batteries known heretofore are classified into sintered negative electrodes and non-sintered negative electrodes. A sintered negative electrode is produced by filling a nickel sintered substrate, which is prepared by sintering nickel powder, with a negative active material made of cadmium oxide or cadmium hydroxide. On the other hand, a non-sintered negative electrode is produced by first preparing a paste by kneading a negative active material comprising cadmium oxide or cadmium hydroxide with synthetic fibers, glue material (binder), etc., and then coating and adhering the resulting paste to an electrically conductive core body (substrate) such as a punching metal and the like.

In the negative electrodes above, a sintered negative electrode exhibits high reactivity, high charge and discharge efficiency, and excellent properties in absorbing gaseous oxygen, because the negative active material is brought into direct contact with the nickel sintered substrate having excellent electric conductivity. The sintered negative electrode of this type is produced by repeating, for several times, a sequence of operation comprising immersing the nickel sintered substrate in an aqueous cadmium nitrate solution, drying, and converting the resulting product into cadmium hydroxide in an alkaline aqueous solution. In this manner, a sintered substrate filled with a predetermined quantity of negative active material (cadmium hydroxide) can be obtained.

However, the as-prepared sintered substrate filled with a predetermined quantity of cadmium hydroxide not only is still low in activity of the active material, but also contains impurities such as nitrate groups in the electrode plate, which badly influences the cell characteristics. Hence, the cadmium negative electrode filled with the active material requires chemical conversion treatment. Such a chemical conversion treatment comprises, in general, charging and discharging the cadmium negative electrode filled with the active material in an alkaline aqueous solution for one to several times. However, a chemical conversion treatment by charging and discharging led to a problem of decreasing the production efficiency, because it increased not only the process steps, but also the time duration of treatment.

Accordingly, a method for removing impurities such as nitrate groups by applying heat treatment to the cadmium negative electrode after filling it with an active material was proposed in, for instance, JP-A-61-85772 and JP-A-62-115662. Since the method proposed in JP-A-61-85772 and JP-A-62-115662 simply requires the cadmium negative electrode filled with the active material to be heat treated at a temperature of 200° C. or higher under an inert gas atmosphere, it enables improving the productivity of the cadmium negative electrode of this type; i.e., it allows removal of the impurity in less process steps and in a shorter period of time, and is thereby suitable for continuous treatment.

In the cadmium negative electrode of the type above, however, positive electrode control (i.e., controlling the capacity of the positive active material lower than the capacity of the negative active material) should be maintained. Accordingly, a pre-charging step for imparting discharge reserve to the cadmium negative electrode after filling it with the active material is provided. Hence, even in the method proposed in JP-A-61-85772 and JP-A-62-115662 above, pre-charging for imparting the discharge reserve must be carried out after the heat treatment.

In case the cadmium negative electrode is immersed in an alkaline aqueous solution for pre-charging, cadmium oxide generated by heat treatment undergoes hydration to generate cadmium hydroxide. However, since cadmium hydroxide thus generates is low in electrochemical activity, there occurred a problem that the pre-charging time must be taken longer to achieve the necessary discharge reserve by pre-charging. Since a longer pre-charging time increases the amount of charge, this led to a problem of making low-cost production unfeasible. Furthermore, since the pre-charging time is also elongated, there occurred another problem that the production efficiency is lowered due to the increase in production time. Moreover, in case the pre-charging time is shortened in order to reduce the production time, it resulted in insufficient amount of discharge reserve, and caused a problem of poor cycle characteristics.

In the light of such circumstances, in JP-A-11-273669 was proposed a method comprising adding polyvinyl pyrrolidone of relatively low degree of polymerization, which is excellent in charge-discharge characteristics, into cadmium oxide active material, such that the charge acceptance of the cadmium negative electrode should be improved. However, this method only improves the inferior charge acceptance of the polyvinyl pyrrolidone of relatively low degree of polymerization to a level well comparable to that of a known cadmium negative electrode. Further, there was found another problem that, although polyvinyl pyrrolidone was effective on improving discharge characteristics, no effect was discernible on improving the charge characteristics.

On the other hand, in Japanese Patent No. 2567672 is proposed a method comprising firing a cadmium negative electrode filled with an active material at a temperature of 200° C. or higher to convert the active material into cadmium oxide, and then adding a polysaccharide or a derivative thereof having a polymerization degree of 320 or higher. In case of the cadmium negative electrode proposed in Japanese Patent No. 2567672, the active material is added in the state of cadmium oxide having a smaller volume. Thus, since a larger amount of polysaccharide can be added to the electrode plate as compared to a case of adding in the state of cadmium hydroxide, the degradation in characteristics can be suppressed at the charge-discharge cycles; furthermore, by thus performing chemical conversion by charging and discharging after the addition, the utilization factor can be elevated as compared with an electrode plate to which the polysaccharide is added after the chemical conversion. However, the use of a polysaccharide with a polymerization degree of 320 or higher resulted in the formation of a stubborn polymer film, and this film functioned as a resistance on charging and discharging. Thus, this led to a problem of reducing, in particular, the operation voltage on discharge.

SUMMARY OF THE INVENTION

In the light of such circumstances, the invention has been made to overcome the problems enumerated above, and an object thereof is to provide a method for producing a cadmium negative electrode having excellent cycle characteristics, without impairing the production efficiency even in case the impurities incorporated during filling the active material should be removed by heat treatment.

In order to achieve the object above, the method for producing sintered cadmium negative electrode according to the invention comprises: an active material filling step comprising filling the nickel sintered substrate with an active material based on cadmium hydroxide to obtain an active material filled electrode plate; a heating step comprising heating the active material filled electrode plate to change at least a part of the thus filled active material based on cadmium hydroxide into cadmium oxide; a polyvinyl alcohol adding step comprising adding polyvinyl alcohol into the active material filled electrode plate through the heating step; and a hydration step comprising hydrating the active material filled electrode plate added with polyvinyl alcohol (i.e., a step comprising immersing the electrode plate in an alkaline solution to convert cadmium oxide into cadmium hydroxide).

In case the electrode plate filled with the active material is subjected to heat treatment, most of the filled cadmium hydroxide ($Cd(OH)_2$) is converted into cadmium oxide, and by immersion in an aqueous alkaline solution in the subsequent hydration step, it is hydrated and re-converted into cadmium hydroxide. The cadmium hydroxide thus generated by hydration is β-type cadmium hydroxide having a smaller surface area. However, in case polyvinyl alcohol (PVA) is added to the heat-treated electrode plate prior to the hydration, polyvinyl alcohol reacts with the active material (cadmium hydroxide) on hydration as to generate γ-type cadmium hydroxide having an acicular crystal structure and a larger surface area. Since cadmium hydroxide having a larger surface area results in an improved charge acceptance, the quantity of charged electricity can be reduced at precharging. Accordingly, this enables cadmium negative electrode with lower quantity of charged electricity and having excellent cycle characteristics.

Since the temperature at which cadmium hydroxide converts into cadmium oxide is ca. 180° C., the temperature for heat treatment should be set to 180° C. or higher.

Furthermore, in case the amount for converting cadmium hydroxide into cadmium oxide is less than 70% by mass with respect to the total mass of the active material as reduced to cadmium hydroxide, impurities such as nitrate groups in the active material remains insufficiently decomposed. Such impurities negatively influences when assembled into a cell as to increase self discharge. Hence, the amount converted into cadmium oxide must account for 70% by mass or higher with respect to the mass of total active material as reduced to cadmium hydroxide.

In case the amount of adding polyvinyl alcohol (PVA) is too small, polyvinyl alcohol tends to insufficiently react with the active material, and this results in an insufficient formation of γ-type cadmium hydroxide having an acicular crystal structure and a larger surface area.

On the other hand, polyvinyl alcohol added in excess inhibits the charge-discharge reaction. Accordingly, the amount of adding polyvinyl alcohol is preferably confined as such that it may fall in a range of from 0.03 to 10% by mass with respect to the mass of the total active material as reduced to cadmium hydroxide.

Furthermore, in case the polymerization degree of polyvinyl alcohol (PVA) added prior to hydration should exceed 2000, the coating film of polyvinyl alcohol (PVA) that is formed on the surface of the negative electrode becomes too stubborn as to inhibit the charge-discharge reaction. Thus, preferably, polyvinyl alcohol (PVA) having a polymerization degree of 2000 or lower is added into the cadmium negative electrode prior to hydration.

DETAILED DESCRIPTION OF THE PREFERRED EMBODIMENTS

Figure 1:
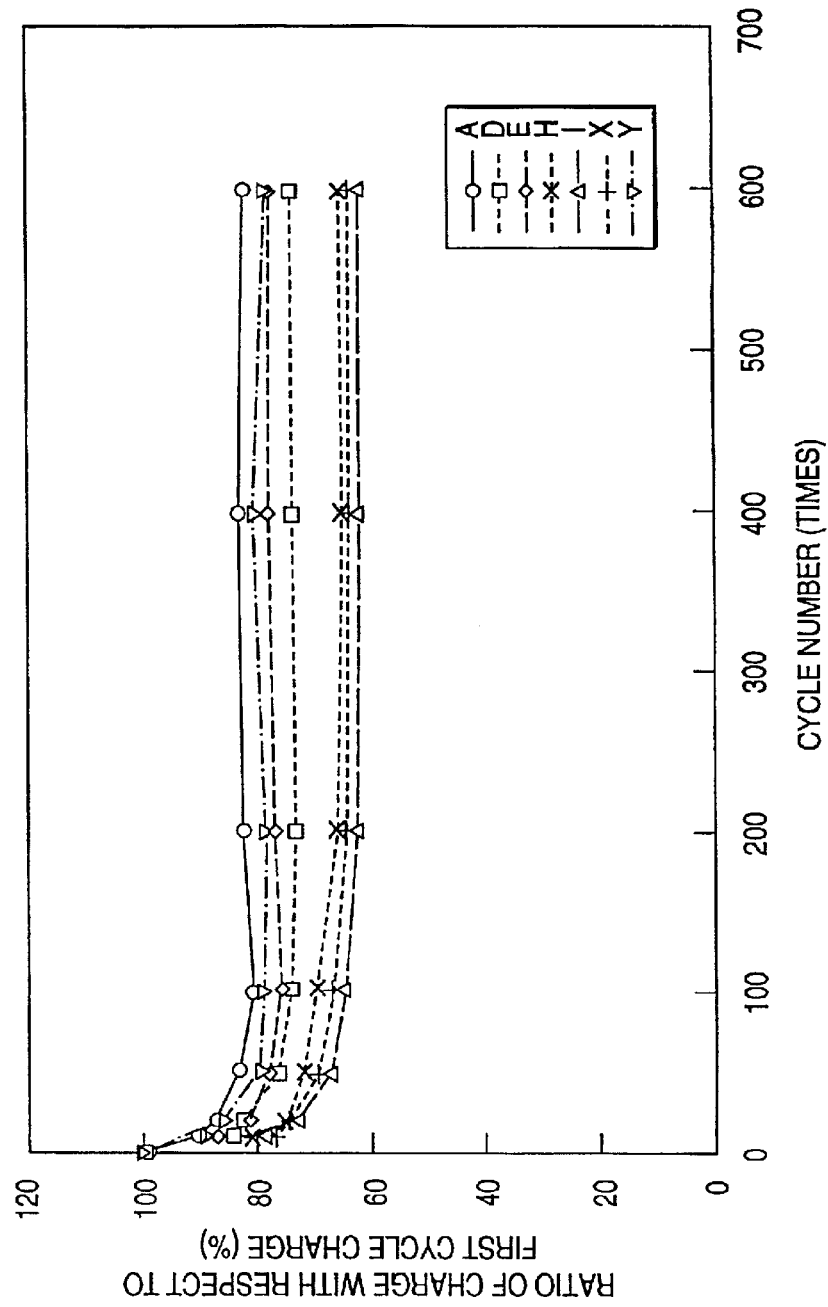
FIG. 1 is a diagram showing the relation between the cycle repetition times and cell capacity in an assembled nickel-cadmium storage battery.

An embodiment for producing a sintered cadmium negative electrode according to the invention is described below in the order of active material filling step, heating step, PVA adding step, and hydration and pre-charging step.

EXAMPLE (1) Active Material Filling Step

The surface of an electrically conductive core body made from punched metal was coated with nickel slurry, and the resulting product was sintered under a reducing atmosphere to obtain a nickel sintered substrate (having a porosity of about 80%). Then, the nickel sintered substrate was immersed in an impregnating solution containing cadmium nitrate as the principal component thereof, and, after drying, it was subjected to alkali treatment fill the pores of the nickel sintered substrate with cadmium hydroxide. The entire operation (chemical impregnation method) was repeated for predetermined times to fill the pores of the nickel sintered substrate with a predetermined amount of cadmium active material (a negative active material based on cadmium hydroxide). Thus was obtained an active material filled electrode plate.

(2) Heating Step

Then, the active material filled electrode plate thus obtained was placed inside a heating furnace maintained at a temperature of 180° C., and was subjected to a heat treatment for a predetermined duration of time to thereby convert cadmium hydroxide ($Cd(OH)_2$) filled in the nickel sintered substrate into cadmium oxide (CdO). In this manner, the impurities such as nitrate groups adhered to the active material filled electrode plate were decomposed and removed. In this case, the heating time for the active material filled electrode plate placed in the heating furnace was set to 30 minutes to thereby obtain an active material filled electrode plate containing 99% by mass (denoted as "mass %" hereinafter) of converted cadmium oxide with respect to the total mass of the active material (i.e., the total active material as reduced to cadmium hydroxide). Thus was obtained a heated electrode plate α.

The fact that converted cadmium oxide accounted for 99 mass % of the total mass of the active material (as reduced to cadmium hydroxide) can be easily confirmed by measuring the masses of the active material filled electrode plate before and after the heat treatment.

Similarly, a heated electrode plate β containing converted cadmium accounting for 70 mass % of the active material was obtained by controlling the heating time to 18 minutes, a heated electrode plate γ containing converted cadmium accounting for 60 mass % of the active material was obtained by controlling the heating time to 15 minutes, and a heated electrode plate δ containing converted cadmium accounting for 50 mass % of the active material was obtained by controlling the heating time to 12 minutes.

(3) PVA Adding Step

Subsequently, each of the heated electrode plates α, β, γ, and δ thus obtained by heat treatment was immersed for a predetermined duration of time into polyvinyl alcohol (PVA:

having a polymerization degree of 500; POVAL (trademark) of grade 105, manufactured by Kuraray Co., Ltd.) adjusted to a predetermined concentration, and was dried to add a predetermined amount of polyvinyl alcohol on the surface and to the inside of the active material filled electrode plate. Thus were obtained PVA-added electrode plates.

More specifically, the heated electrode plate α (containing cadmium oxide accounting for 99 mass % of the active material) was immersed in a 5.0-mass % aqueous PVA solution for a duration of 3 minutes to obtain a PVA-added electrode plate a1 containing 0.20 mass % of PVA with respect to the amount of active material (hereinafter, the amount of active material is a value reduced to cadmium hydroxide).

Similarly, a PVA-added electrode plate b1 containing 0.05 mass % of added PVA was prepared by immersing the heated electrode plate α in a 1.0-mass % aqueous PVA solution for a duration of 3 minutes, and a PVA-added electrode plate c1 containing 1.00 mass % of added PVA was prepared by immersing the heated electrode plate α in a 10-mass % aqueous PVA solution for a duration of 5 minutes.

Furthermore, a PVA-added electrode plate d1 containing 0.03 mass % of added PVA was prepared by immersing the heated electrode plate β (containing cadmium oxide accounting for 70 mass % of the active material) in a 1.0-mass % aqueous PVA solution for a duration of 2 minutes, and a PVA-added electrode plate e1 containing 1.00 mass % of added PVA was prepared by immersing the heated electrode plate β in a 10-mass % aqueous PVA solution for a duration of 5 minutes.

Further, the heated electrode plate γ (containing cadmium oxide accounting for 60 mass % of the active material) was immersed in a 5.0-mass % aqueous PVA solution for a duration of 3 minutes to obtain a PVA-added electrode plate f1 containing 0.20 mass % of PVA with respect to the amount of active material.

Then, the heated electrode plate δ (containing cadmium oxide accounting for 50 mass % of the active material) was immersed in a 5.0-mass % aqueous PVA solution for a duration of 3 minutes to obtain a PVA-added electrode plate g1 containing 0.20 mass % of PVA with respect to the amount of active material.

Furthermore, the heated electrode plate α was immersed in a 0. 5-mass % aqueous PVA solution for a duration of 3 minutes to obtain a PVA-added electrode plate h1 containing 0.02 mass % of PVA with respect to the amount of active material, and the heated electrode plate α was immersed in a 15.0-mass % aqueous PVA solution for a duration of 3 minutes to obtain a PVA-added electrode plate i1 containing 1.50 mass % of PVA with respect to the amount of active material.

(4) Hydration and Pre-charging Step

Subsequently, each of the thus obtained PVA-added electrode plates a1, b1, c1, d1, e1, f1, g1, h1, and i1 was immersed into an aqueous potassium hydroxide solution (having a specific gravity of 1.23), was subjected to a predetermined pre-charging (charging for 30% with respect to the electrode plate capacity; charging for 18 minutes at 1 It (wherein, It is a value expressed by rated capacity (Ah)/1 h (time)) by using metallic nickel plate as the counter electrode, and was subjected to rinsing and drying. Thus were obtained cadmium negative electrodes a, b, c, d, e, f, g, h, and i.

2. Comparative Example

Separately, the heated electrode plate α, whose 99% of the active material (cadmium hydroxide) was changed into cadmium oxide, was immersed into an aqueous potassium hydroxide solution (having a specific gravity of 1.23), was subjected to a predetermined pre-charging (in a manner similar to the pre-charging described above) by using a metallic nickel plate as the counter electrode, and was subjected to rinsing and drying. Thus was obtained a chemically converted electrode plate x1 having a predetermined pre-charge similar to above. Further, a chemically converted electrode plate y1 having pre-charged to 110% of predetermined pre-charge was prepared.

Subsequently, the thus obtained chemically converted electrode plates x1 and y1 were each immersed in a 5.0-mass % aqueous PVA solution for a duration of 3 minutes to achieve a PVA addition of 0.20 mass % with respect to the amount of active material (in this case again, active material in a base reduced to cadmium hydroxide), and were dried to obtain cadmium negative electrodes x and y having polyvinyl alcohol added to the surface and in the inside of the chemically converted electrode plates.

3. Measurement of Discharge Capacity

Then, each of the cadmium negative electrodes a, b, c, d, e, f, g, h, i, x, and y was allowed to discharge in an aqueous potassium hydroxide solution (having a specific gravity of 1.23) at a current of 1.0 It until a voltage of 1.50 V was achieved with respect to metallic nickel plate used as the counter electrode. From the discharge time, the quantity of discharge (i.e., quantity of discharge reserve) by pre-charging was obtained for each of the cadmium negative electrodes a, b, c, d, e, f, g, h, i, x, and y. Then, from each of the discharge for the cadmium negative electrodes a, b, c, d, e, f, g, h, i, x, and y, the discharge capacity ratio (%) was calculated by taking the discharge quantity of the cadmium negative electrode x as 100. The results are given in Table 1 below.

TABLE 1

| Type of electrode plate | CdO generated (%) | Added PVA (%) | Timing of adding PVA | Pre-charge | Discharge capacity ratio (%) |
|---|---|---|---|---|---|
| a | 99 | 0.20 | before hydration | fixed | 112 |
| b | 99 | 0.05 | before hydration | fixed | 107 |
| c | 99 | 1.00 | before hydration | fixed | 109 |
| d | 70 | 0.03 | before hydration | fixed | 106 |
| e | 70 | 1.00 | before hydration | fixed | 107 |
| f | 60 | 0.20 | before hydration | fixed | 103 |
| g | 50 | 0.20 | before hydration | fixed | 96 |
| h | 99 | 0.02 | before hydration | fixed | 100 |
| i | 99 | 1.50 | before hydration | fixed | 97 |
| x | 99 | 0.20 | after hydration | fixed | 100 |
| y | 99 | 0.20 | after hydration | 110% | 109 |

From the results shown in Table 1 above, on comparing cadmium negative electrode x with the cadmium negative electrode a containing 99 mass % of cadmium oxide (CdO) converted by heat treatment and 0.20 mass % of added PVA, it can be clearly understood that the cadmium negative electrode a yields discharge capacity for pre-charging larger by about 12% as compared with that of the cadmium negative electrode x. Further comparing the cadmium negative electrode a with the cadmium negative electrode y containing the generated cadmium oxide (CdO) and the added PVA at same quantities but increased in pre-charging by 10%, it can be understood that the cadmium negative electrode a yields discharge capacity for pre-charging larger by about 3% as compared with that of the cadmium negative electrode y.

In the case of cadmium negative electrode a, almost all of the active material (cadmium hydroxide) is converted into cadmium oxide at the heat treatment, and a proper amount of PVA is added to the electrode plate. Thus, the results indicate that, at pre-charging, the cadmium negative electrode a is converted into cadmium hydroxide having a large surface area (i.e., γ-type cadmium hydroxide) by the hydration which occurs on immersing the cadmium negative electrode a into an aqueous alkaline solution. Thus, presumably, the charge acceptability of the cadmium negative electrode a is increased at pre-charging as to exhibit superior discharge capacity for pre-charging as compared with the case of cadmium negative electrode y having its pre-charge capacity increased by 10%.

Further, on comparing the discharge capacity for pre-charging between the cases in which the amount of cadmium oxide (CdO) generated by heat treatment is set to the same amount of 99 mass %, and in which the amount of added PVA is changed, it can be understood that the discharge capacity for pre-charging decreases for too high or too low an amount of added PVA. More specifically, as compared with the case of cadmium negative electrode x, the discharge capacity is higher for all of cadmium negative electrode a containing 0.20 mass % of added PVA, cadmium negative electrode b containing 0.05 mass % of added PVA, and cadmium negative electrode c containing 1.00 mass % of added PVA.

On the other hand, the cadmium negative electrode h containing 0.02 mass % of added PVA and the cadmium negative electrode i containing 1.50 mass % of added PVA yield lower discharge capacities for pre-charging as compared with the case of cadmium negative electrode x. This is attributed to the fact that too small an addition of PVA results in a small ratio of converted cadmium oxide having large surface area (i.e., γ-type cadmium hydroxide), and in a less improvement on charge acceptability. On the other hand, an addition of PVA in excess inhibits the charge reaction.

The facts above indicate that there is an optimal range in the addition of PVA. Thus, the amount of added PVA (the "amount of added PVA" in this case signifies the amount added with respect to the total mass as reduced to cadmium hydroxide) is preferably more than 0.02 mass % and less than 1.50 mass %.

Further, on changing the conditions of heat treatment to vary the amount of generated cadmium oxide (CdO), it can be understood that the discharge capacity for pre-charging increases with increasing amount of generated cadmium oxide. More specifically, the discharge capacity for pre-charging decreases in the order of cadmium negative electrode a containing 99 mass % of cadmium oxide generated by heat treatment (the generated amount in this case signifies the quantity generated with respect to the total quantity of active material as reduced to cadmium hydroxide), cadmium negative electrodes d and e containing 70 mass % of generated cadmium oxide, cadmium negative electrode f containing 60 mass % of generated cadmium oxide, and cadmium negative electrode g containing 50 mass % of generated cadmium oxide.

The above fact is attributed to the decrease in ratio of cadmium oxide converted into active cadmium hydroxide (i.e., γ-type cadmium hydroxide) having a large surface area on hydration, thereby resulting in a decrease in charge acceptability at pre-charging. This therefore results in discharge capacity for pre-charging. From the results above, it can be understood that, in order to maintain the discharge capacity for pre-charging sufficiently high at a value well equivalent to that of cadmium negative electrode x or higher, the amount of generated cadmium oxide is preferably set to 60% or higher.

4. Production of Sealed Type Nickel-cadmium Storage Batteries

Each of the cadmium negative electrodes a, b, c, d, e, f, g, h, and i of the examples as well as the cadmium negative electrodes x and y of the comparative examples prepared above was cut into a predetermined size, and were each assembled into an electrode body by winding them together with a known sintered nickel positive electrode plate used as counter electrode, with an unwoven nylon cloth separator interposed between them.

Each of the electrode bodies thus obtained was inserted inside an outer can, and after injecting a 25 mass % aqueous potassium hydroxide solution (KOH) inside the outer can, the cans thus obtained were each sealed to obtain nickel-cadmium storage batteries (with a nominal capacity of 1300 mAh) A, B, C, D, E, F, G, H, I, X, and Y.

Thus were obtained nickel-cadmium storage battery A from cadmium negative electrode a, nickel-cadmium storage battery B from cadmium negative electrode b, nickel-cadmium storage battery C from cadmium negative electrode c, nickel-cadmium storage battery D from cadmium negative electrode d, and nickel-cadmium storage battery E from cadmium negative electrode e.

Furthermore, there were prepared nickel-cadmium storage battery F from cadmium negative electrode f, nickel-cadmium storage battery G from cadmium negative electrode g, nickel-cadmium storage battery H from cadmium negative electrode h, and nickel-cadmium storage battery I from cadmium negative electrode i.

Similarly, there were obtained nickel-cadmium storage battery X from cadmium negative electrode x and nickel-cadmium storage battery Y from cadmium negative electrode y.

5. Measurement of Storage Capacity

Subsequently, each of the nickel-cadmium storage batteries A, B, C, D, E, F, G, and X was charged for 16 hours with a charge current of 0.1 It (160% charge), and after allowing to stand for 28 days at an ordinary temperature (about 25° C.), they were each allowed to discharge at a discharge current of 1 It until the cell voltage (final voltage) became 1.0 V. Thus was obtained the discharge capacity (storage capacity) for each of the cells A, B, C, D, E, F, G, and X from the discharge time. Further, from the discharge after storage for each of the cells A, B, C, D, E, F, G, and X thus obtained, the ratio of discharge after storage (storage capacity ratio (%)) for each of the cells A, B, C, D, E, F, G, and X was calculated with respect to the nominal capacity taken as 100. The results are shown in Table 2 below.

TABLE 2

| Type of cell | CdO generated (%) | Added PVA (%) | Timing of adding PVA | Pre-charge | Storage capacity ratio (%) |
|---|---|---|---|---|---|
| A | 99 | 0.20 | before hydration | fixed | 76 |
| B | 99 | 0.05 | before hydration | fixed | 75 |
| C | 99 | 1.00 | before hydration | fixed | 75 |
| D | 70 | 0.03 | before hydration | fixed | 73 |
| E | 70 | 1.00 | before hydration | fixed | 72 |
| F | 60 | 0.20 | before hydration | fixed | 66 |
| G | 50 | 0.20 | before hydration | fixed | 51 |
| X | 99 | 0.20 | after hydration | fixed | 75 |

From the results shown in Table 2 above, it can be clearly understood that the storage characteristics of the cells decreases with decreasing amount of generated cadmium oxide (the generated amount in this case again signifies the quantity generated with respect to the total quantity of active material as reduced to cadmium hydroxide). This is presumably attributed to the fact that a decrease in the amount of generated cadmium oxide led to an insufficient decomposition of impurities such as nitrate groups adsorbed on filling the active material, and that it thereby resulted in low storage characteristics of the cell. Since storage characteristics well equivalent to or higher than that of cell X is obtained in case the generated amount of cadmium oxide is 70 mass % or higher, the amount of generated cadmium oxide is preferably set to 70 mass % or higher.

6. Charge-discharge Cycle Test

Then, each of the nickel-cadmium storage batteries A, D, E, H, I, X, and Y was subjected to a charge-discharge cycle test. Thus, each of the cells was charged at a charge current of 0.1 It for 16 hours (160% charge) at an ordinary temperature (ca. 25° C.), and after stopping charging for 1 hour, each of the cells was allowed to discharge at a discharge current of 1 It until the cell voltage (final voltage) reached 1.0V. After performing the charge-discharge test, the ratio of discharge capacity at each cycle with respect to the capacity of the first cycle (i.e., the discharge capacity ratio with respect to the capacity of the first cycle (%)) was plotted in the ordinate while taking the number of cycle on the abscissa. Thus were obtained results shown in FIG. 1.

From the results shown in FIG. 1, it can be clearly understood that the cycle characteristics of the cell A (using the cadmium negative electrode containing 99 mass % of generated CdO and containing PVA added at an amount of 0.20 mass % before hydration; shown by open circles o in FIG. 1) is far improved as compared with that of cell X (using the cadmium negative electrode containing 99 mass % of generated CdO and containing PVA added at an amount of 0.20 mass % after hydration; shown by crosses + in FIG. 1). Furthermore, it can be understood that cell A yields cycle characteristics well comparable to, or even higher than, that of cell Y having a larger pre-charge (using the cadmium negative electrode containing 99 mass % of generated CdO, containing PVA added at an amount of 0.20 mass % after hydration, and subjected to pre-charging amounting to 110% of the fixed value; shown by reversed open triangles ▽ in FIG. 1). This is attributed to the improvement in the charge acceptability in pre-charging the negative electrode a that was used in cell A. Thus, a larger discharge reserve amount was achieved to improve the cycle characteristics.

Furthermore, although cell D (using a negative electrode containing 70 mass % of generated CdO and containing PVA added at an amount of 0.03 mass % before hydration; shown by reversed open squares ☐ in FIG. 1) and cell E (using a negative electrode containing 70 mass % of generated CdO and containing PVA added at an amount of 1.00 mass % before hydration; shown by reversed open rhombs ◇ in FIG. 1) yield characteristics somewhat inferior to that of cell A, they still show improvements as compared with the case of cell X.

The fact above can be explained as follows. In cell D, the amount of generated CdO in cadmium negative electrode d was 70 mass %, which was smaller than that of cadmium negative electrode a, and the amount of added PVA was 0.03 mass %, which was also smaller than that of cadmium negative electrode a; thus, the amount of cadmium hydroxide having a larger surface area, which generated on hydration, decreased, and the charge acceptability on pre-charging resulted somewhat lower than the case of cadmium negative electrode a. These thereby led to yield a lower discharge reserve.

In cell E, the amount of generated CdO in cadmium negative electrode e was 70 mass %, and this was smaller than that of cadmium negative electrode a; thus, the amount of cadmium hydroxide having a larger surface area, which generated on hydration, decreased. However, the amount of added PVA was 1.00 mass %; this was larger than that of cadmium negative electrode a, and it led to the formation of a thicker PVA film to result in a somewhat impaired charge acceptability on pre-charging. Thus, it thereby resulted in a lower discharge reserve.

On the other hand, it can be understood that cell H (using a negative electrode containing 99 mass % of generated CdO and containing PVA added at an amount of 0.02 mass % before hydration; shown by crosses x in FIG. 1) and cell I (using a negative electrode containing 99 mass % of generated CdO and containing PVA added at an amount of 1.50 mass % before hydration; shown by open triangles Δ in FIG. 1) yield charge-discharge characteristics well comparable to those of cell X. The fact above can be explained as follows. In cell H, the amount of PVA added to CdO in cadmium negative electrode h was 0.02 mass %, which was far smaller than that of cadmium negative electrode a. Thus, the amount of cadmium hydroxide having a larger surface area, which generated on hydration, decreased, and the charge acceptability on pre-charging resulted lower than the case using cadmium negative electrode a. It thereby led to yield a discharge reserve nearly equal to that of cadmium negative electrode x.

In cell I, the amount of added PVA was 1.50 mass %; this was far larger than that of cadmium negative electrode a, and it led to the formation of a thicker PVA film to result in an inferior charge acceptability on pre-charging as compared to the case using negative electrode a. It thereby led to yield a discharge reserve nearly equal to that of cadmium negative electrode x.

From the facts above, it can be understood that the amount of generated cadmium oxide is preferably controlled to 70 mass % or higher, and that the amount of PVA to be added before hydration is controlled to a range of 0.03 mass % or higher and 1.10 mass % or lower.

7. Study on the Polymerization Degree of PVA

In each of the examples above, description was given on cases using polyvinyl alcohol having a polymerization degree of 500 (PVA: POVAL (trademark) of grade 105, manufactured by Kuraray Co., Ltd.). Thus, the influence of the polymerization degree of the PVA on the discharge capacity after pre-charging was studied. Firstly, a heated electrode plate α subjected to the heat treatment described hereinbefore was immersed in an aqueous solution containing 5.0 mass % of PVA having a polymerization degree of 2000 (POVAL (trademark) of grade 120, manufactured by Kuraray Co., Ltd.) for 3 minutes to obtain a heated electrode plate containing PVA added at 0.20 mass % with respect to the mass of active material, and was dried to obtain a PVA-added electrode plate. The PVA-added electrode plate thus prepared was subjected to pre-charging (to achieve 30% charge of the electrode plate capacity) in a manner similar to that described above, and was further subjected to rinsing and drying. Thus was obtained cadmium negative electrode j.

Furthermore, a heated electrode plate α subjected to the heat treatment described hereinbefore was immersed in an aqueous solution containing 5.0 mass % of PVA having a polymerization degree of 2400 (POVAL (trademark) of grade 124, manufactured by Kuraray Co., Ltd.) for 3 minutes to obtain a heated electrode plate containing PVA added at 0.20 mass % with respect to the mass of active material, and was dried to obtain a PVA-added electrode plate. The PVA-added electrode plate thus prepared was subjected to pre-charging (to achieve 30% charge of the electrode plate capacity) in a manner similar to that described above, and was further subjected to rinsing and drying. Thus was obtained cadmium negative electrode k.

The cadmium negative electrodes j and k were allowed to discharge in a manner similar to above, and the discharge capacity for pre-charging was obtained from the discharge time for each of the cadmium negative electrodes j and k. Then, the discharge capacity ratio (%) for each of the cadmium negative electrodes a, j and k was calculated by taking the discharge quantity of the cadmium negative electrode x as 100. The results are given in Table 3 below.

improved to enable lowering of charge in pre-charging, and thereby enables a cadmium negative electrode having excellent cycle characteristics.

In the embodiments above, description has been given for an example performing hydration treatment on pre-charging; i.e., the method comprises immersing a heat treated electrode plate subjected to a heat treatment for removing nitrate groups, and performing pre-charging to effect the hydration treatment at the same time. However, the invention is not only limited to the case above, and similar effects can be achieved in case hydration treatment is performed after the heat treatment and prior to pre-charging.

What is claimed is:

1. A method for producing sintered cadmium negative electrode comprising forming the sintered cadmium negative electrode by filling a nickel sintered substrate with cadmium hydroxide as an active material, said method comprising:
    an active material filling step comprising filling the nickel sintered substrate with an active material based on cadmium hydroxide to obtain an active material filled electrode plate;
    a heating step comprising heating the active material filled electrode plate to change at least a part of the thus filled active material based on cadmium hydroxide into cadmium oxide;
    a polyvinyl alcohol adding step comprising adding polyvinyl alcohol into the electrode plate; and

TABLE 3

| Type of electrode plate | CdO generated (%) | Polymerization degree of PVA | Amount of added PVA (%) | Timing of adding PVA | Pre-charge | Discharge capacity ratio (%) |
|---|---|---|---|---|---|---|
| a | 99 | 500 | 0.20 | before hydration | fixed | 112 |
| j | 99 | 2000 | 0.20 | before hydration | fixed | 105 |
| k | 99 | 2400 | 0.20 | before hydration | fixed | 98 |
| x | 99 | 500 | 0.20 | after hydration | fixed | 100 |

From the results shown in Table 3, it can be understood that cadmium negative electrode k containing PVA with polymerization degree of 2400 yields a smaller discharge capacity as compared with that of the comparative example, i.e., cadmium negative electrode x. On the other hand, cadmium negative electrode j having PVA with polymerization degree of 2000 added thereto yields a discharge capacity larger than that of the cadmium negative electrode x, but that it yields a discharge capacity smaller than cadmium negative electrode a containing PVA with polymerization degree of 500. This is presumably ascribed to the fact that a PVA with higher polymerization degree leads to the formation of a stubborn PVA film on the surface of the cadmium negative electrode, and that the film thus formed functions as to inhibit the charge-discharge reaction by preventing the contact between the electrolyte and the active material. Conclusively, it can be understood that it is preferred to use PVA having a polymerization degree of 2000 or lower in adding PVA before the hydration of cadmium negative electrode.

As described above, the invention comprises adding polyvinyl alcohol (PVA) to the heat treated electrode plate before hydrating cadmium negative electrode. Thus, polyvinyl alcohol functions to the active material (cadmium hydroxide) on hydration to allow the formation of γ-type cadmium hydroxide having an acicular crystal structure and a large surface area. Thus, the charge acceptability is a hydration step comprising hydrating the electrode plate.

2. A method for producing sintered cadmium negative electrode as claimed in claim 1, wherein, in the heating step, said active material filled electrode plate is heated to 180° C. or higher to change 70% by mass or more of the total active material as reduced to cadmium hydroxide into cadmium oxide.

3. A method for producing sintered cadmium negative electrode as claimed in claim 2, wherein, in the polyvinyl alcohol adding step, the polymerization degree of added polyvinyl alcohol is 2000 or lower.

4. A method for producing sintered cadmium negative electrode as claimed in claim 1, wherein, in the polyvinyl alcohol adding step, the polyvinyl alcohol is added in such a manner that the added amount of polyvinyl alcohol should account for 0.03 to 1.00% by mass with respect to the mass of the total active material as reduced to cadmium hydroxide.

5. A method for producing sintered cadmium negative electrode as claimed in claim 4, wherein, in the polyvinyl alcohol adding step, the polymerization degree of added polyvinyl alcohol is 2000 or lower.

6. A method for producing sintered cadmium negative electrode as claimed in claim 1, wherein, in the polyvinyl alcohol adding step, the polymerization degree of added polyvinyl alcohol is 2000 or lower.

* * * * *